United States Patent [19]

Terai et al.

[11] Patent Number: 5,408,490
[45] Date of Patent: Apr. 18, 1995

[54] GAS LASER DEVICE

[75] Inventors: Kiyohisa Terai, Kanagawa; Takaaki Murata, Mie; Tohru Tamagawa, Tokyo; Hideyuki Shinonaga, Mie; Hirokatsu Suzuki, Tokyo, all of Japan

[73] Assignee: Kabushiki Kaisha Toshiba, Kawasaki, Japan

[21] Appl. No.: 38,686

[22] Filed: Mar. 29, 1993

[30] Foreign Application Priority Data

Mar. 31, 1992 [JP] Japan .................... 4-077442
Dec. 8, 1992 [JP] Japan .................... 4-327683

[51] Int. Cl.$^6$ ............................. H01S 3/097
[52] U.S. Cl. ............................. 372/87; 372/83
[58] Field of Search ............... 372/87, 82, 83

[56] References Cited

U.S. PATENT DOCUMENTS

| | | |
|---|---|---|
| 4,719,640 | 1/1988 | Chenausky et al. ........ 372/87 |
| 4,959,840 | 9/1990 | Akins et al. ............... 372/87 |
| 5,018,161 | 5/1991 | Akins et al. ............... 372/87 |
| 5,018,162 | 5/1991 | Akins et al. ............... 372/87 |
| 5,023,884 | 6/1991 | Akins et al. ............... 372/87 |
| 5,027,366 | 6/1991 | Akins et al. ............... 372/87 |
| 5,029,177 | 7/1991 | Akins et al. ............... 372/87 |
| 5,033,055 | 7/1991 | Akins et al. ............... 372/87 |
| 5,042,047 | 8/1991 | Ono et al. ................. 372/87 |

Primary Examiner—Rodney B. Bovernick
Assistant Examiner—Robert E. Wise
Attorney, Agent, or Firm—Oblon, Spivak, McClelland, Maier & Neustadt

[57] ABSTRACT

A gas laser device includes a high frequency power source for generating a high frequency output voltage and a pair of electrodes positioned sandwiching a discharge gap through which laser gas circulates. The pair of the electrodes are connected to the high frequency power source for applying the high frequency output voltage across the electrodes to achieve discharge in the discharge gap and to thereby generate laser light. Each of the electrodes includes an electrode element, a capacity coupling control element provided on either side of the electrode element, and a dielectric shell. The dielectric shell surrounds the electrode element and the capacity coupling control element, therefore the discharge occurs between the dielectric shells of a pair of the electrodes. The dielectric constant of the capacity coupling control means is lower than that of the dielectric shell.

14 Claims, 9 Drawing Sheets

GAS LASER DEVICE

BACKGROUND OF THE INVENTION

1. Field of the Invention

The present invention relates to a gas laser device which generates or amplifies laser light by applying a high frequency voltage across electrodes to achieve a discharge, and more particularly to a gas laser device designed to make the power density between the electrodes uniform by using a dielectric.

2. Description of the Related Art

FIG. 18 shows an outline of the configuration of a conventional cross-flow gas laser device. In FIG. 18, a pair of dielectric electrodes 1 are placed face to face sandwiching the discharge gap 2 through which the laser gas circulates in the direction indicated by the arrow A. The dielectric electrodes 1 are made by covering electrode means 3, which has a shape elongated in the direction orthogonal to the laser gas flow (the direction orthogonal to the surface of the page), with a dielectric shell 4. if a high-frequency voltage from a high-frequency power source 5 is applied across the electrode means 3 in a cross-flow gas laser device which has been made in this way, then the laser gas flowing through the discharge gap 2 is stimulated and laser light is generated in the direction perpendicular to the surface of the page by providing a resonator in a direction perpendicular to the surface of the page, though this is not depicted here. In this case, the presence of the dielectric shell 4 around the electrode means 3 makes the power density in the discharge gap 2 uniform, allows a homogenous discharge and gives a stable laser output.

The frequency of the high-frequency voltage applied across the electrode means 3 needs to be raised to at least 700 kHz if the laser oscillation is to be made more efficient. However, there are problems in that, if the output frequency of the high-frequency power source 5 is raised, the discharge is needlessly dispersed to either side of the electrode means 3 due to capacity coupling via the dielectric shell 4 which covers the electrode means 3, and, as a result, it is difficult to improve the laser oscillation efficiency sufficiently even though the output frequency of the high-frequency power source 5 has been raised.

Further, in some cases, there are also problems that the laser oscillation efficiency will be reduced completely counter to what was initially intended.

SUMMARY OF THE INVENTION

Accordingly, one object of the present invention is to provide a gas laser device which is able to improve the laser oscillation efficiency by using a dielectric electrode.

These and other objects of this invention can be achieved by providing a gas laser device which includes a high frequency power source for generating high frequency output voltage and a pair of electrodes positioned sandwiching a discharge gap through which laser gas circulates. The pair of electrodes are connected to the high frequency power source for applying the high frequency output voltage across the electrodes to achieve discharge in the discharge gap to thereby generate laser light. Each of the electrodes includes electrode means, capacity coupling means for provided on either side of the electrode means for leakage control, and a dielectric shell. The dielectric shell surrounds portions of the electrode means and the capacity coupling control means facing the discharge gap, thereby the discharge occurs between the dielectric shells of the pair of electrodes. The dielectric constant of the capacity coupling control means is lower than that of the dielectric shell.

When a high-frequency voltage is applied across the electrode parts to a pair of dielectric electrodes, laser light is generated by the stimulation of the laser gas circulating in the discharge gap between these dielectric electrodes. In this case the power density in the discharge gap is made uniform because there are dielectric shells around the electrode means. Further, because there are capacity coupling control means with lower dielectric constants than the shells on the either side of the electrode means, the discharge is prevented from dispersing to either side of the electrode means even when a high-frequency voltage is applied to the electrode means, with the result that the laser oscillation efficiency is improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
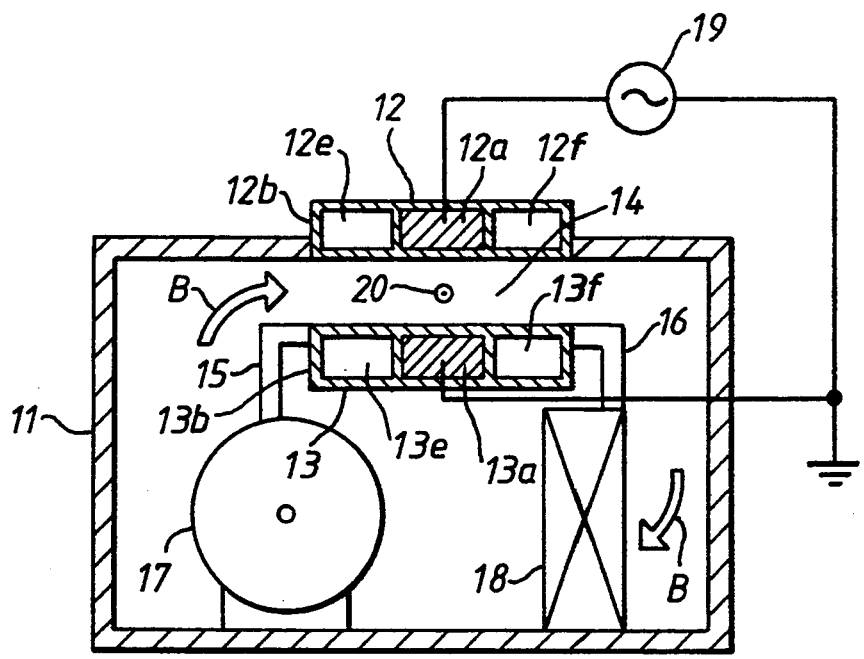
FIG. 1 is a view showing a cross sectional structure of a cross-flow gas laser device according to a first embodiment of this invention.

Referring now to the drawings, wherein like reference numerals designate identical or corresponding parts throughout the several views, the embodiments of this invention will be described below.

A first embodiment of the present invention is described below with reference to FIG. 1 and FIG. 2.

Figure 2:
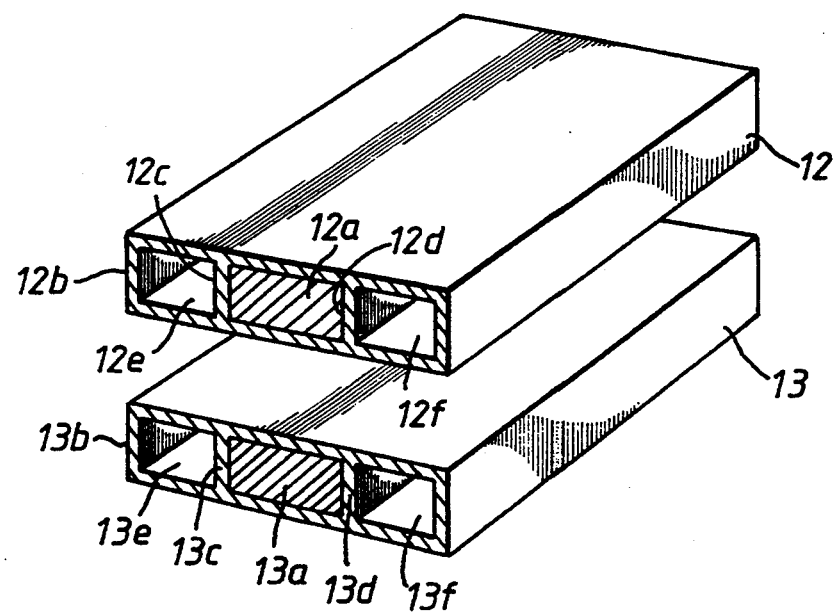
FIG. 2 is an oblique view showing a pair of electrodes partially sectioned in the embodiment of FIG. 1.

FIG. 1 shows the cross sectional structure of a so-called cross-flow gas laser device in which the gas flow is orthogonal to the optical axis of the output. In FIG. 1, a first dielectric electrode 12 is placed in the middle of the top of a chamber 11, which has a rectangular cross section, so as to face the inside of the chamber 11, and in this case the bottom surface of the first dielectric electrode 12 is arranged so as to form a planar shape in the same plane as the inside surface of the chamber 11.

A second dielectric electrode 13, which forms a pair with the first dielectric electrode 12, is placed in the center inside the chamber 11, and it is arranged in such a way that there is a discharge gap 14 between the two dielectric electrodes 12 and 13 when it has been so placed. In this case, the second dielectric electrode 13 is arranged so as to be supported by support members 15 and 16, its top surface is parallel with the bottom surface of the first dielectric electrode 12 and it has a planar shape in the same plane as the support members 15 and 16.

A blower 17 for circulating the laser gas and a heat exchanger 18 for cooling the laser gas are placed toward the bottom of the inside of the chamber 11. The laser gas is sealed at a pressure of about 65 torr inside the chamber 11, is circulated in the direction of the arrow B by means of the blower 17, and is cooled by the heat exchanger 18 after it has flowed through the discharge gap 14.

The actual configuration of the first dielectric electrode 12 and second dielectric electrode 13 will be described with reference to FIG. 2. Only the first dielectric electrode 12 is explained below because they have the same configuration, and the explanation of the second dielectric electrode 13 is omitted by giving identical references to elements which are identical to the first dielectric electrode 12.

To elaborate, the first dielectric electrode 12 is made up of electrode means 12a with a rectangular cross section formed with a shape elongated in the direction orthogonal to the flow of the laser gas mentioned above, and a rectangular container-shaped dielectric (e.g. ceramic) shell 12b provided so as to envelop the electrode means 12a. In this case, three spaces extending in a direction orthogonal to the laser gas flow are formed in an adjacent state in the shell 12b by dividing the inside with partition walls 12c and 12d. The electrode means 12a is provided in the central space so that the left and right spaces are constructed as capacity coupling control means 12e and 12f with dielectric constants lower than that of the shell 12b.

Moreover, the spaces forming the capacity coupling control means 12e, 12f, 13e and 13f are configured so that the dielectric constants in these areas are extremely low by exposing these to the atmosphere, sealing an insulating gas on the inside, or connecting the inside to the laser gas atmosphere.

Further, as shown in FIG. 1, when a high-frequency voltage from a high-frequency power source 19 is applied across the electrode means 12a and 13a of the first dielectric electrode 12 and the second dielectric electrode 13, the laser gas flowing through the discharge gap 14 is stimulated and the laser light 20 is generated in a direction orthogonal to the surface of the page. In this case, because of the dielectric shells 12b and 13b around the electrode parts 12a and 13a, the power density in the discharge gap 14 is made uniform and a homogenous discharge can therefore be formed and a stable laser output obtained.

In this case, because a configuration has been adopted in which there are the capacity coupling control means 12e, 12f and 13e and 13f with extremely low dielectric constants on either side of the electrode means 12a and 13a, unnecessary dispersion of the discharge to either side of the electrode parts 12a and 13b is prevented even under circumstances where the high-frequency voltage has been applied as described above. As a result, unnecessary discharge losses can be controlled and therefore inconveniences do not arise even when the output frequency of the high-frequency power source 19 has been raised substantially, and the laser oscillation efficiency can thereby be improved.

There are several reasons why the discharge in the discharge gap 14 may be unstable, but it is clear that one of these is the partial rise in temperature of the laser gaps, which has a major bearing on the instability of the discharge. This is known as thermal instability and stems from the fact that the electron density is subject to widely discrepant variations as the laser gas density is subject to partial variations as the temperature rises. Therefore, when partial stagnation occurs in the laser gas flow toward the discharge gap 14, the laser gas temperature is locally raised by the discharge input in this area, the electron density is subject to large variations due to the subsequent variation in the laser gas density and the discharge in the discharge gap 14 becomes unstable and, on occasion, so-called filamentation occurs.

In the above embodiment, a configuration has been adopted in which the bottom surface of the first dielectric electrode 12 and the top surface of the second dielectric electrode 13, which is to say the surfaces facing the discharge gap 14 in the shells 12b and 13b, have a planar shape following the flow of laser gas in this discharge gap 14. Therefore the laser gas flows smoothly in the discharge gap 14, there is no risk that partial stagnation of laser gas flow will be induced, with the result that discharge stability is improved and that the laser oscillation efficiency can also be improved in this respect too.

Generally, as for the calculation of the electric field, only the static electric field can be obtained just before starting discharge. In order to obtain the dimension of the effective capacity coupling control means, we have made it possible to calculate the distribution of the discharge current during the discharge operation. Typical examples of the calculation result are shown in FIG. 3. In FIG. 3, the cross sectional structure of the right half portion of the first dielectric electrode 12 is shown, and 12a is the electrode means, 12f is the capacity coupling control means and 12h is dielectric of the shell 12b. In FIG. 3, the distribution of the discharge current I is shown such that the length of the segment extending from the surface of the dielectric 12h facing the discharge gap represents the magnitude of the discharge current I.

Figure 3C:
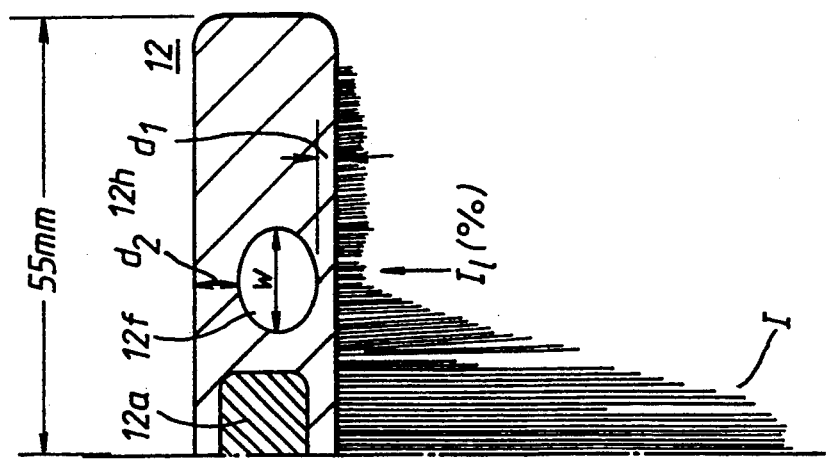
FIG. 3a, 3b, and 3c are diagrams showing a result of the calculation of the distribution of the discharge current during the discharge operation in the embodiment of FIG. 1.
Figure 3B:
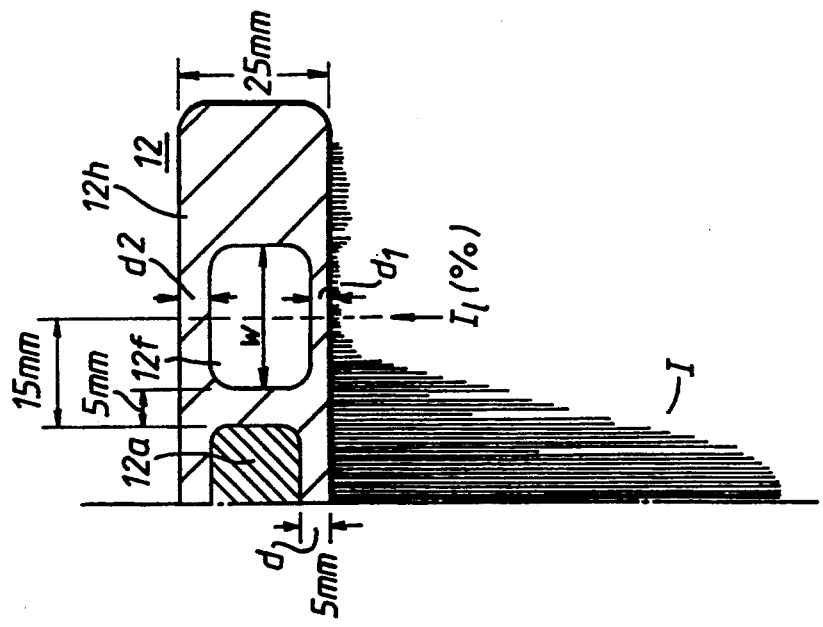
Figure 3A:
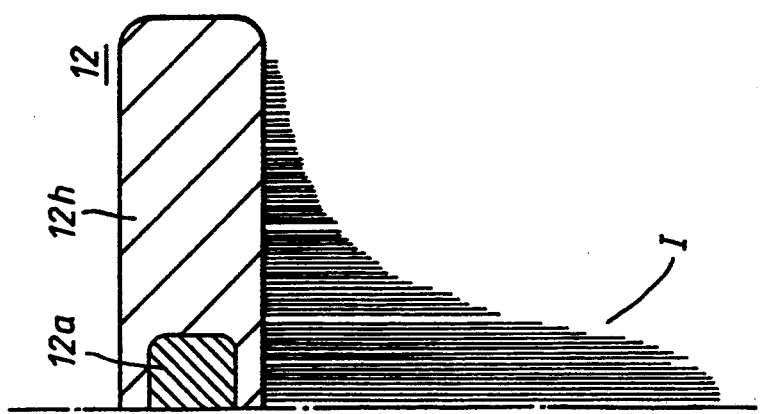

FIG. 3(a) shows the case where the capacity coupling control means is not provided. It is understood that the segment representing the current distribution exists not only below the electrode means 12a but also leaks out considerably in the lateral direction thereof.

FIG. 3(b) and 3(c) show the cases where the capacity coupling control means 12f with a rectangular and a circular cross section are provided, respectively. In FIG. 3(b), the corner portions of the capacity coupling control means 12f is made to have a curved surface with a appropriate curvature due to the problem of the strength of the structure of means 12f. In FIG. 3(b) and 3(c), as a result of providing the capacity coupling control means 12f in the electrode, it is understood that the current distribution at the surface facing the discharge gap just under the capacity coupling control means 12f is remarkably reduced.

The dimensions of the effective capacity coupling control means 12f can be obtained by the electric field calculation method newly developed by the Applicants.

The parameters of the dimensions are defined as follows:

d1 is a space between the capacity coupling control means 12f and the surface of the dielectric 12h facing the discharge gap, W is a width of the capacity coupling control means 12f and d2 is a space between the capacity coupling control means 12f and the opposite surface facing the discharge gap. For the evaluation of the current control, a current I1 is used which is a current at a location 15 mm away from the electrode means 12a. The current I1 is expressed as 40% of the current at the center of the electrode part 12a. The leak current within a location which is spaced apart from the electrode means 12a by the length c arable to the radius of the laser beam actually used can be converted to the laser beam. The value of 15 mm is employed because the leak current at the above-described location is permitted.

Figure 4:
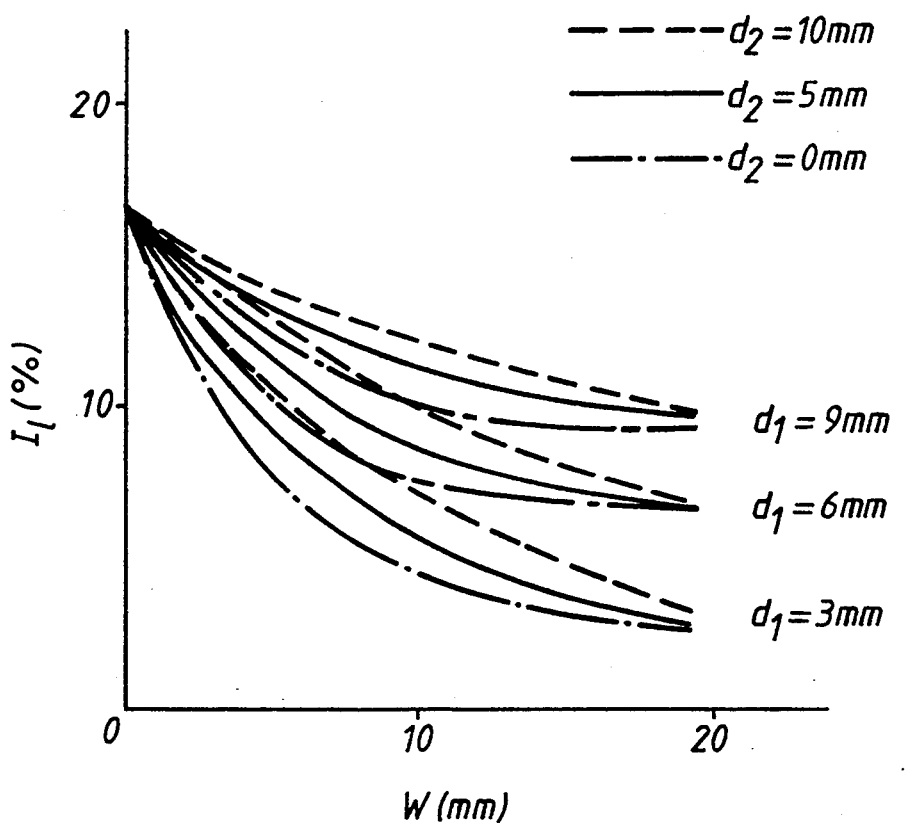
FIG. 4 is a diagram showing the variation of the calculated leak current I1 with the width W, the spaces d1 and d2.
Figure 5:
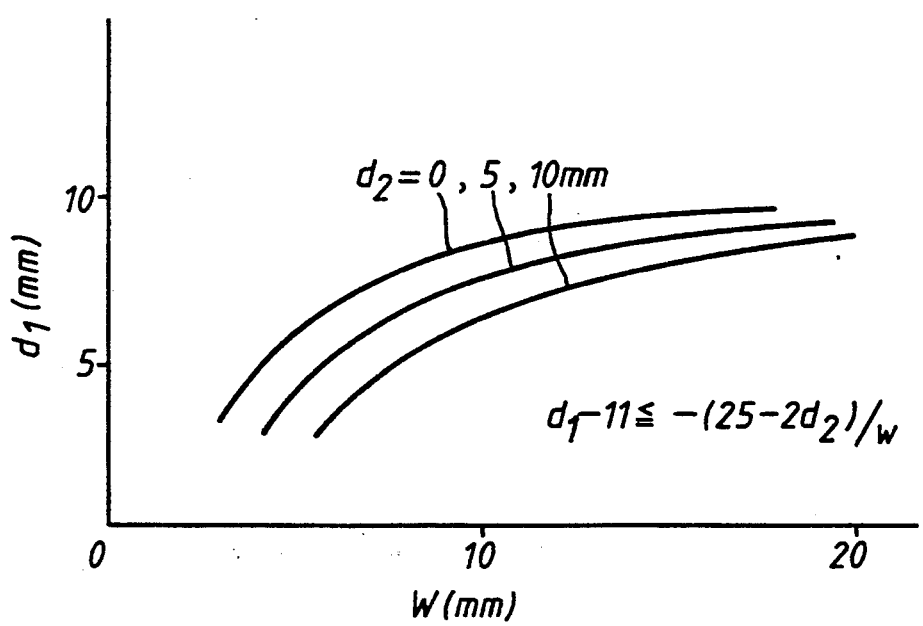
FIG. 5 is a diagram showing the relation of the calculated leak current I1 with the width W, the spaces d1 and d2.

FIG. 4 shows the variation of the calculated leak current I1 with the width W, and the spaces d1 and d2. In the case without the capacity coupling control means, the leak current I1 is about 16% where the width W is zero. The values of the width W, the spaces d1 and d2 are calculated where the leak current I1 is below 10% which is the value permitted for the practical use. The calculation result is shown in FIG. 5. An approximate equation expressing the graph of FIG. 4 is obtained and it is the following equation (1).

$$d1 - 11 \leq -(25 - 2 \times d2)/W \quad (1)$$

Accordingly, the capacity coupling control means 12f is to be provided with the dimensions satisfying equation (1).

In this calculation, it is supposed that aluminum oxide which is general ceramic is employed as the dielectric and the dielectric constant e1 of the aluminum oxide is 10. And it is supposed that the capacity coupling control means 12f is filled with a gas and the dielectric constant c2 of the gas is 1. In the case where other material is used, it is necessary to multiply the right side of the equation (1) by the factor $\epsilon2/\epsilon1 \times 10$, approximately. Moreover, the equation (1) is obtained in the case where the space d between the electrode means 12a and the surface of the dielectric 12h facing the discharge gap is 5 mm. In the case where the space d(mm) is not 5 mm, it is necessary to multiply the right side of the equation (1) by d/5.

Figure 6:
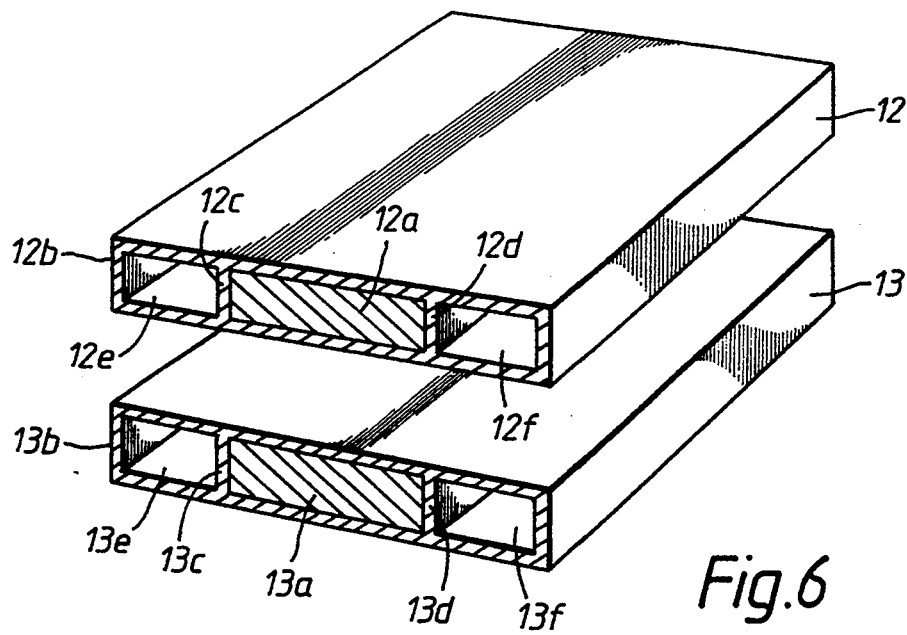
FIG. 6 is an oblique view showing a pair of electrodes partially sectioned in a second embodiment of this invention.

Moreover, the laser light 20 produced as described above is placed in a resonant state using a reflecting mirror which is not depicted. When the width of the discharge gap 14 needs to be set large, such as when the optical path in the resonator for the laser light 20 is formed in a U-shape or when it is formed in a Z-shape, it may be arranged as in FIG. 6 which shows a second embodiment of the present invention. Namely, the width dimensions of the electrode means 12a and 13a of the dielectric electrodes 12 and 13 may be arranged so as to obtain a state conforming with the optical path of the last light 20 in the resonator.

Figure 7:
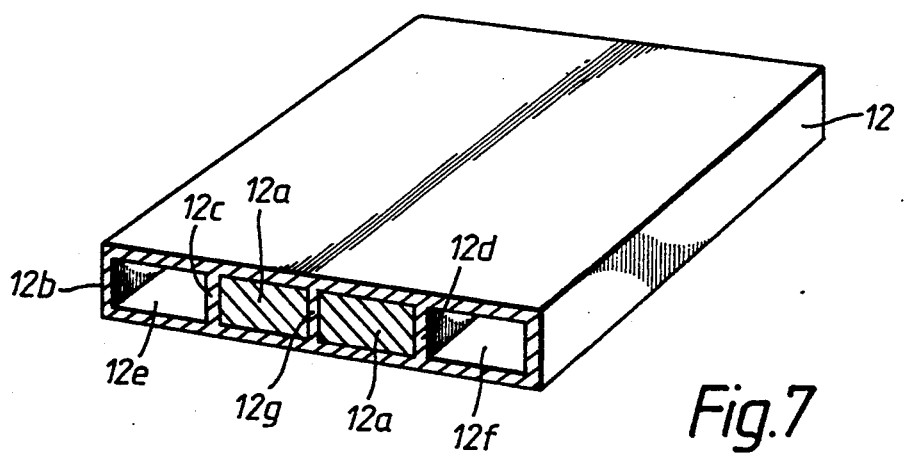
FIG. 7 is an oblique view showing one of a pair of electrodes partially sectioned in a third embodiment of this invention.

Further, when the width of the discharge gap 14 needs to be set large in this way, then, as in FIG. 7 which shows a third embodiment of the present invention, a configuration may be adopted in which the electrode means 12a and 13a are divided in two corresponding to the optical path of the laser light 20. In this case a configuration may be adopted in which reinforcing partition walls 12g (only depicted on the side of the first dielectric electrode 12) are also provided between the divided electrode means.

Figure 8:
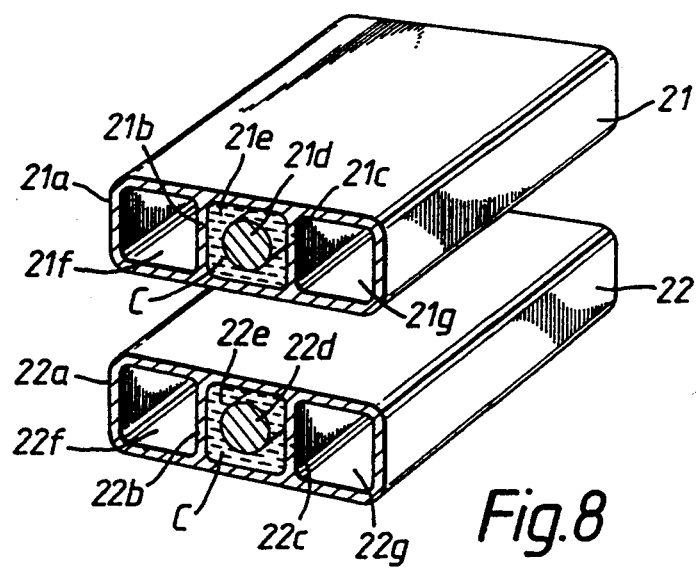
FIG. 8 is an oblique view showing a pair of electrodes partially sectioned in a fourth embodiment of this invention.
Figure 9:
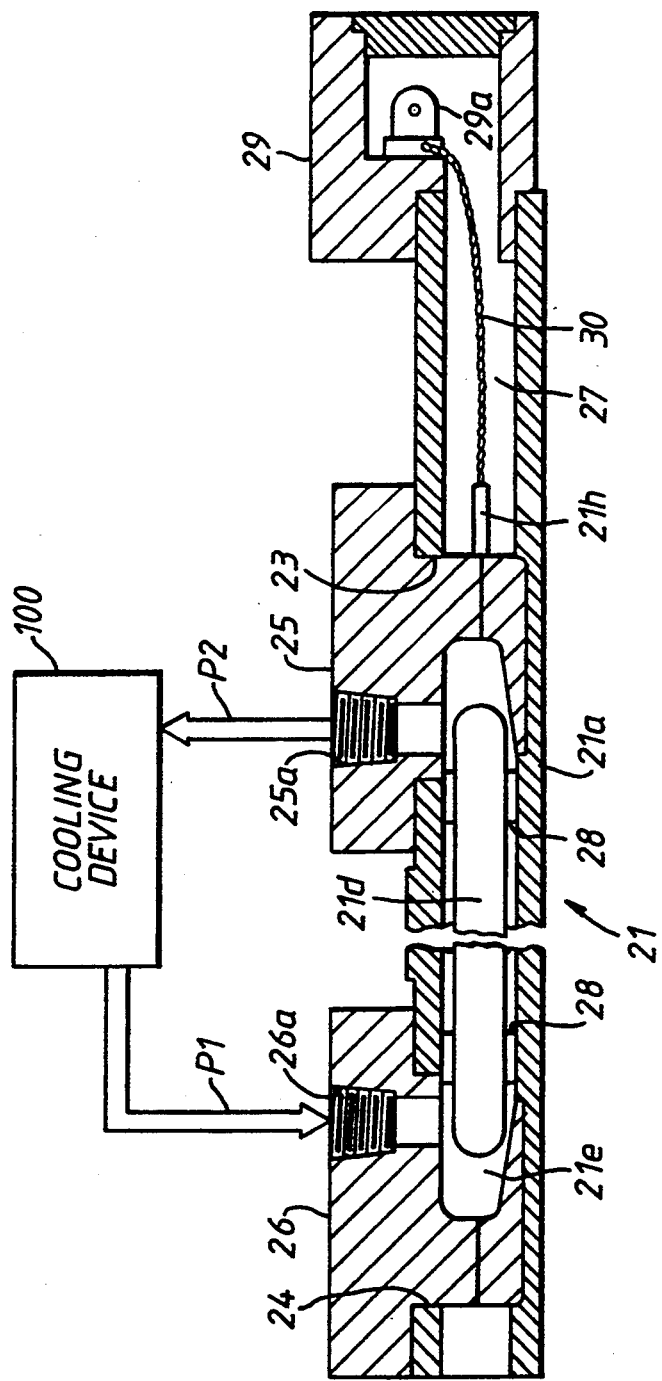
FIG. 9 is a longitudinally sectioned side view of the central part of one of the electrodes of the embodiment shown in FIG. 8.

FIG. 8 and FIG. 9 show a fourth embodiment of the present invention and only those parts which differ from the first embodiment are discussed in the explanation below.

In FIG. 8, a first dielectric electrode 21 and a second dielectric electrode 22 placed face to face sandwiching the discharge gap 14 have the same shape and are surrounded by shells 21a and 22a shaped like a rectangular container formed with an elongated shape in the direction orthogonal to the laser gas flow. These shells 21a and 22a are made of a dielectric such as a ceramic, and three spaces are formed in each in an adjacent state extending in a direction orthogonal to the laser gas flow by dividing the insides of each with partition walls 21b, 21c and 22b and 22c. In this case, the spaces in the middle are arranged as electrode housing chambers 21e and 22e intended to house means 21d and 22d with circular cross sections, and the left and right spaces are arranged as capacity coupling control means 21f, 21g and 22f and 22g with lower dielectric constants than the shells 21a and 22a respectively. Moreover, the arrangement is such that the dielectric constant is extremely low by exposing these capacity coupling control parts 21f and 21g and 22f and 22g to the atmosphere, sealing an insulating gas on the inside, or connecting the inside to the laser gas atmosphere. Water C, for example, is made to flow as a cooling medium inside the electrode housing chambers 21e and 22e.

An explanation is given below of the actual configuration of the electrode housing chamber 21e on the side of the first dielectric electrode 21, and the parts connected thereto, with reference to FIG. 9. Moreover, the configuration of the second dielectric electrode 22 is not explained as it is basically the same as the first dielectric electrode 21, and, when it proves necessary to mention the second dielectric electrode 22, the same references will be cited.

FIG. 9 is a longitudinally sectioned side view of the central section of the first dielectric electrode 21 shown in FIG. 5. To elaborate, in FIG. 9, openings 23 and 24 are formed facing the electrode housing chamber 21e in each of the upper surface regions towards both edges of the shell 21a. The electrode housing chamber 21e is fixed by inserting resin sealing members 25 and 26 via openings 23 and 24. In this case, the opening 23 positioned on one edge (the right edge in the figure) of the shell 21a is formed with a relatively long dimension between the edges, thereby forming an adjacent air chamber 27 via the sealing member 25 and electrode housing chamber 21e in the shell 21a. Moreover, this air chamber 27 is opposed to the atmosphere.

Further, an outflow port 25a connected to the inside of the electrode housing chamber 21e is formed in the sealing member 25, and an inflow port 26a similarly connected to the inside of the electrode housing chamber 21e is formed in the sealing member 26. The water C (refer to FIG. 5) flows, via the inflow port 26a and outflow port 25a, inside the electrode housing chamber 21e.

The electrode means 21d is provided with a space between the inside wall of the electrode housing chamber 21e by being supported via a plurality of silicon rubber spacers 28 placed at intervals inside the electrode housing chamber 21e, so that the water C can flow through the area around it.

A terminal 21h, which forms a thin rod, projects integrally at one end of the electrode part 21d, and this terminal 21h passes through the sealing member 25 in a watertight manner and projects into the air chamber 27. Further, a resin terminal mount 29 is attached to the end of the shell 21a, and the terminal 21h is connected, via a lead wire 30, to a relay terminal 29a on the terminal mount 29. Moreover, the relay terminal 29a is connected to the high-frequency power source.

Because the embodiment constructed in this way has capacity coupling control means 21f, 21g and 22f and 22g with extremely low dielectric constants on either side of the electrode means 21d and 22d, the laser oscillation efficiency can be improved in the same way as in the first embodiment mentioned above. Moreover, in this embodiment, there is the water C around the electrode means 21d and 22d, water generally has a relatively high dielectric constant of about 80 and thus this embodiment can be expected to have the effect of making the power density uniform.

In this embodiment, rises in the temperature of the electrode means 21d and 22d are controlled by the water C flowing through the inside of the electrode housing chambers 21e and 22e. So it is possible to prevent distortion occurring between the electrode means 21d and 22d and the shells 21a and 22a in the dielectric electrodes 21 and 22, due to the different thermal expansion coefficients of the two. Consequently, there is no risk that cracking or the like will be induced in the part leading out of the electrode housing chambers 21e and 22e of the electrode means 21d and 22d(the sealing member 25 in this embodiment), and water leaking or unnecessary discharge, caused by cracking in this part, is not induced.

Further, in the present embodiment, an arrangement is adopted in which the air chambers 27 are formed adjacent to the electrode housing chambers 21e and 22e via the sealing member 25 in the shells 21a and 22a, and the terminal 21h of the electrode means 21d and 22d projects inside the air chamber 27. Therefore the static ground capacitance of the terminal 21h can be reduced and abnormal discharge in the terminal 21h, which is inevitably of a sharp shape where electric field concentration readily occurs, can be prevented from occurring from the outset. Moreover, in this case, the terminal 21h projecting inside the air chamber 27 is connected to the lead wire 30 for the power source inside the air chamber 27, and therefore the static ground capacity of the lead wire 30 can be reduced and abnormal discharge in this part can be prevented.

Figure 10:
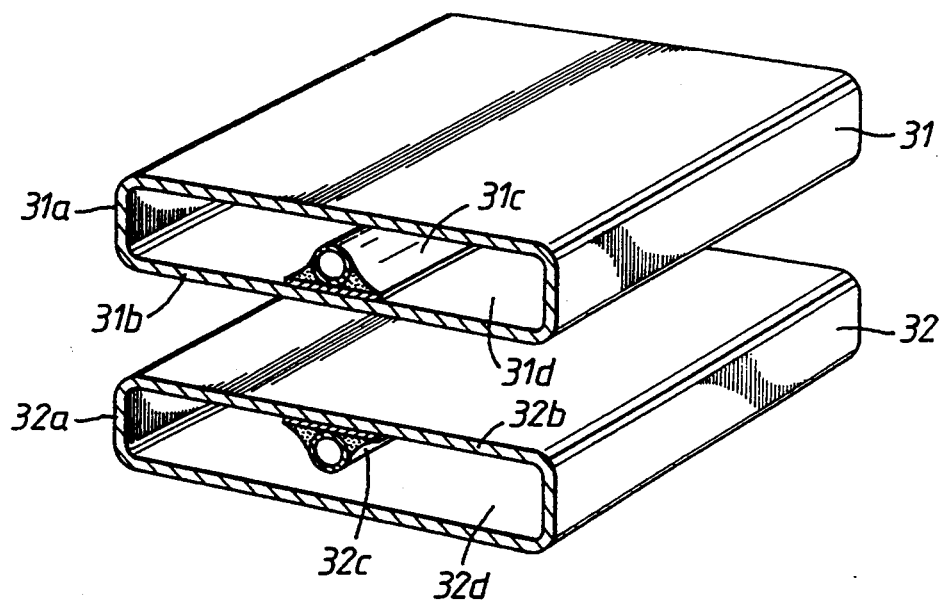
FIG. 10 is an oblique view showing a pair of electrodes partially sectioned in a fifth embodiment of this invention.

FIG. 10 shows a fifth embodiment of the present invention, and this is described below referring only to those elements which are different to the first embodiment discussed previously.

In FIG. 10, the first dielectric electrode 31 and the second dielectric electrode 32 positioned face to face sandwiching the discharge gap 14 have the same shape and have shells 31a and 32a shaped like a rectangular container formed with an elongated shape in the direction orthogonal to the laser gas flow. These shells 31a and 32a are made of a dielectric such as a ceramic, and pipe-shaped electrode means 31c and 32c are also provided extending in a direction orthogonal to the laser gas flow in the facing inner walls 31b and 32b. Moreover, electrode means 31c and 32c are fixed to the inner walls 31b and 32b by brazing for example.

The spaces formed around electrode means 31c and 32c in the shells 31a and 32a are exposed to the atmosphere so that they function as capacity coupling control means 31d and 32d with extremely low dielectric constants. Further, the water acting as the cooling medium flows inside electrode means 31c and 32c.

The embodiment arranged in this way also has a configuration with capacity coupling control means 31d and 32d with extremely low dielectric constants around the electrode means 31c and 32c, and therefore the laser oscillation efficiency can be improved in the same way as in the first embodiment mentioned above. The temperature rise in the electrode means 31c and 32c can be controlled by the water flowing through the inside so that there is no risk that unwanted distortion will be induced as ??? the fourth embodiment mentioned above. In this embodiment, in particular, electrode means 31c and 32c can also be used as the conduit for the water which is the cooling medium and the overall configuration can be simplified.

Figure 11:
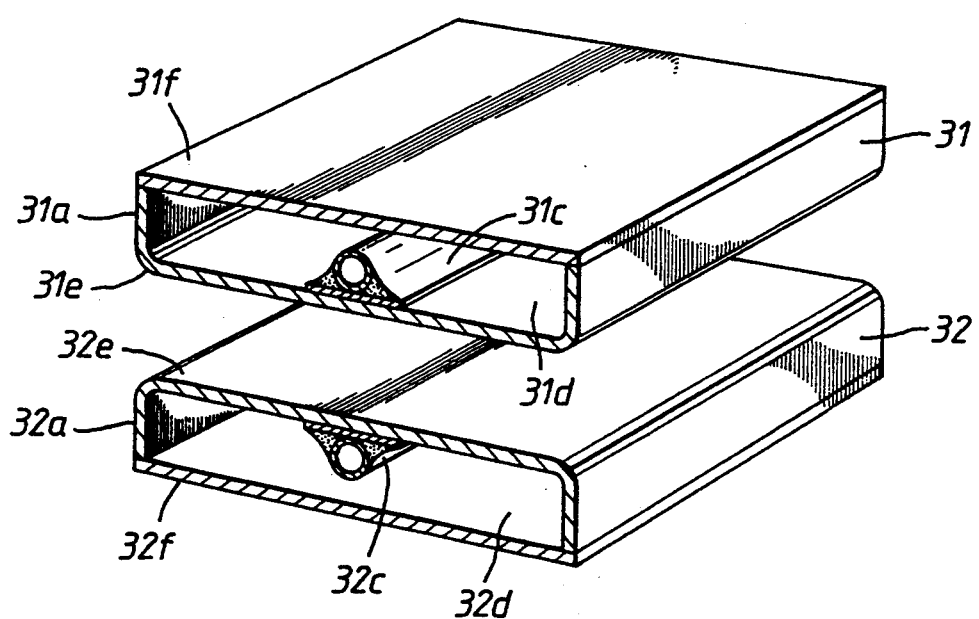
FIG. 11 is an oblique view showing a pair of electrodes partially sectioned in a sixth embodiment of this invention.

Moreover, in the fifth embodiment mentioned above, when there is a risk that the operation of also fixing electrode means 31c and 32c will be difficult, a configuration may be adopted in which the shells 31a and 32a are respectively divided into container-shaped main units 31e and 32e and lids 31f and 32f as in FIG. 11 which shows a sixth embodiment of the present invention.

Additionally, the present invention is not limited to the various embodiments given above, and, for example, an arrangement using a cooling medium other than water may be used, and various modifications may be used provided they do not depart from the purpose of the invention.

Other embodiments of the present invention are described with reference to the figures.

Figure 12:
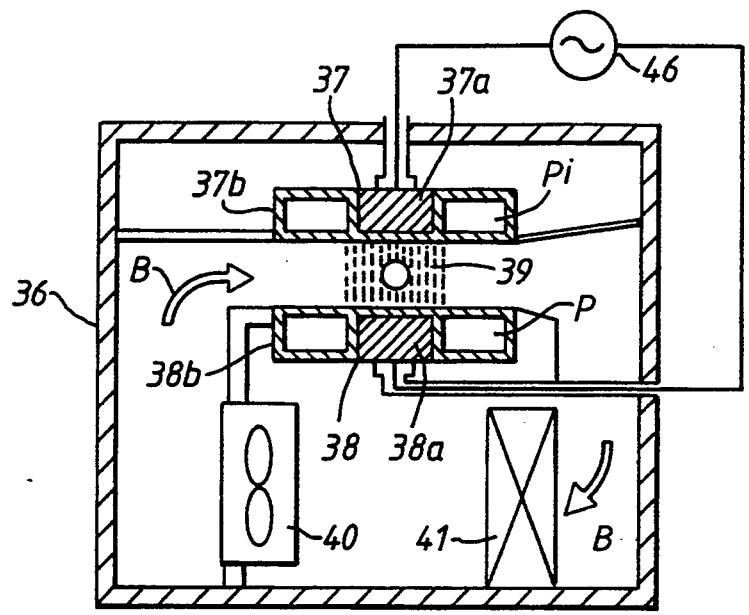
FIG. 12 is a view showing a cross sectional structure of a cross-flow gas laser device according to a seventh and an eighth embodiment of this invention.

FIG. 12 shows a seventh embodiment of the present invention, it shows the cross sectional configuration of a cross-flow gas laser device in which the gas flow is orthogonal to the output optical axis. In FIG. 12, a first dielectric electrode 37 is placed inside of a chamber 36 in the middle of the top of the chamber 36 which has a rectangular cross section.

A second dielectric electrode 38 forming a pair with the first dielectric electrode 37 is placed in the middle in the chamber 36, and the two dielectric electrodes 37 and 38 are arranged to sandwich the discharge gap 39 when the dielectric electrode 38 has been placed in this state. In this case, the top surface of the second dielectric electrode 38 is formed to be parallel with the bottom surface of the first dielectric electrode 37.

A blower 40 for circulating laser gas and a heat exchanger 41 for cooling this laser gas are placed at the bottom inside of the chamber 36. The laser gas is circulated in the direction of the arrow B by the blower 40 and is cooled by the heat exchanger 41 after it has flowed through the discharge region.

Figure 13:
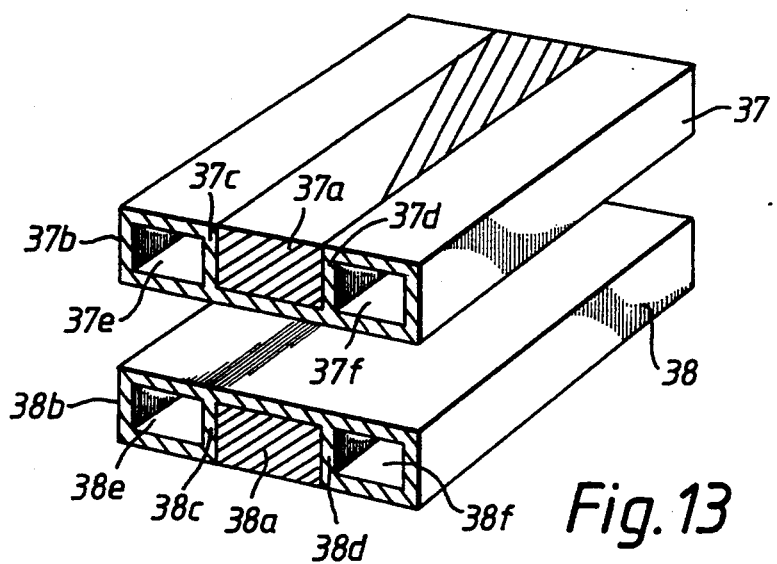
FIG. 13 is an oblique view showing a pair of electrodes partially sectioned in the embodiment shown in FIG. 12.

Actual configuration of the first dielectric electrode 37 and second dielectric electrode 38 are described with reference to FIG. 13 and FIG. 14. But because they have the same configuration, only the first dielectric electrode 37 is described below and the description of the second dielectric electrode 38 is omitted by giving identical references to parts which are identical to the first dielectric electrode 37.

To elaborate, the first dielectric electrode 37 is formed of electrode means 37a with a rectangular cross section formed in a shape elongated in the direction orthogonal to the flow of the said laser gas, and a shell 37b formed of a ceramic which is a dielectric provided so as to envelop this electrode means 37a except for its top surface. In this case, the shell 37b is formed in a state adjacent to electrode means 37a by means of partition walls 37c and 37d, and by providing electrode means 37a in the center, the left and right spaces are formed as capacity coupling control means 37e and 37f with lower dielectric constants than the shell 37b.

Figure 14:
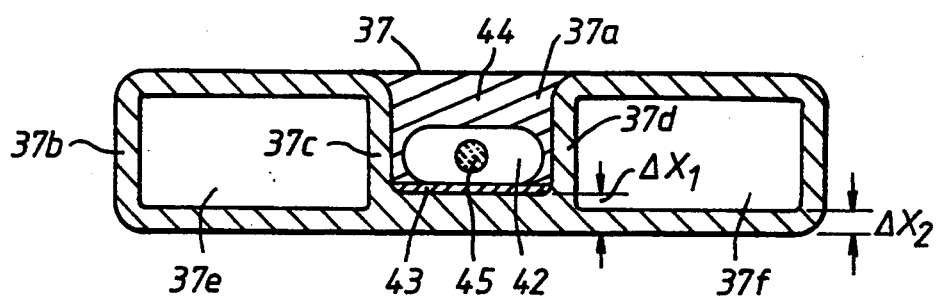
FIG. 14 is a view showing details of a cross section of one of the electrodes shown in FIG. 13.

FIG. 14 shows a cross section of the first dielectric electrode 37 in greater detail. Electrode means 37a comprises a metal electrode 42, a conductive rubber 43 which is a conductive substance, and an insulating rubber 44 which is an insulating substance. Water 45 acting as a cooling medium flows in the metal electrode 42. The conductive rubber 43 is used to keep the shell 37b and the metal electrode 42 hermetically attached. The insulating rubber 44 plays the role of mitigating the electric field of the metal electrode 42. Here, although the water 45 acting as the cooling medium flows in the metal electrode 42, cooling means through which a cooling medium flows may be placed in contact with the metal electrode or in close proximity to the metal electrode. Moreover, the metal electrode 42 may be directly bonded to the shell 37b without using the conductive rubber 43. Further, in FIG. 14, the relationship between the thickness $\Delta X1$ of the dielectric below electrode means 37a and the thickness $\Delta X2$ of the dielectric below the spaces 37e and 37f satisfies the equation $\Delta X1 \leq \Delta X2$.

The operation of this embodiment is described below.

As shown in FIG. 12, when a high frequency voltage from a high frequency power source 46 is applied between electrode means 37a and 38a of first dielectric electrode 37 and second dielectric electrode 38, the laser gas flowing through the discharge gap 39 is stimulated and laser light is produced in a direction perpendicular to the surface of the page by a resonator placed in a direction perpendicular to the page, which is not depicted. Here, dielectric shells 37b and 38b surround electrode means 37a and 38a, and therefore a uniform high frequency discharge is achieved in the discharge gap 39, thereby achieving a stabilized laser output.

In this case, capacity coupling control means 37e and 37f, and 38e and 38f with extremely low dielectric constants are dispersed on either side of electrode means 37a and 38a, and the thickness $\Delta X1$ of the dielectric below the electrode means 37a is thicker than the thickness $\Delta X2$ of the dielectric below the spaces 37e and 37f. Therefore the discharge is controlled from being unnecessarily dispersed to either side of electrode means 37a and 38a even when a high frequency voltage is applied as described above. In this case the condition satisfying the equation $\Delta X1 \leq \Delta X2$ suppresses the unnecessary dispersion more efficiently.

As a result, because losses caused by unnecessary discharge are controlled, the output frequency of the high frequency power source 46 can be raised to at least 700 kHz, thereby allowing an improvement in the laser oscillation efficiency.

Further, because the opposite side of the discharge surfaces of electrode means 37a and 38a are not surrounded by dielectrics, the stresses which concentrate in this region due to discharge arcing can be eliminated, and the reliability of the dielectric electrode is improved. The discharge gap side is surrounded by a dielectric, but the side opposite the discharge surface side is not surrounded by a dielectric so that there is the advantage that the production of electrode means 37a and 38a is made easier.

A cooling path thorough which water 45 acting as a cooling medium flows is provided within metal electrode 42 so that the rise in temperature of electrode means 37a and 38a is controlled, and therefore distortion can be prevented from occurring between electrode means 37a and 38a and shells 37b and 38b in the dielectric electrodes 37 and 38 due to the different thermal expansion coefficients of the two.

The spaces forming capacity coupling control means 37e, 37f, 38e and 38f are exposed to the atmosphere by sealing an insulating gas on the inside or exposing the inside to the laser gas atmosphere, or are put into a very low pressure vacuum state where the discharge is not liable to arcing so that it is also possible to reduce the dielectric constant in this region.

The dielectric constant of the spaces forming capacity coupling control means 37e, 37f, 38e and 38f are low. This means that dielectric breakdown can be avoided in the capacity coupling control means and discharge dispersion can be controlled.

An eighth embodiment according to the present invention is explained below with reference to FIGS. 12, 13 and 14. In this embodiment, the blower 40 circulates the laser gas with a gas pressure P and a heat exchanger 41 cools this laser gas. The insulating gas nitrogen is sealed at a gas pressure Pi in the spaces forming capacity linking control means 37e, 37f, 38e and 38f.

The relationship between the gas pressure P of the laser gas and the gas pressure Pi of the insulating gas satisfies the equation $Pi \geq P$.

According to this embodiment, by sealing the insulating gas in these spaces, the dielectric constant in this region can be reduced, thereby allowing a suitable reduction in the capacity coupling via these spaces and allowing the discharge dispersion to be controlled.

Further, the relationship between the pressure Pi of the insulating gas and the gas pressure P in the laser device satisfies the condition Pi≧P, and therefore dielectric breakdown can be avoided in the capacity coupling control means in the spaces and the discharge dispersion is more effectively controlled without abnormal discharge in the spaces.

Further, air, laser gas and the like may be used in addition to nitrogen as the insulation gas. If laser gas is used as the insulating gas, there will be no problems with laser oscillation even if the insulating gas leaks from the spaces.

Next, a ninth the embodiment of this invention is described with reference to the drawings. A cross sectional configuration of a cross-flow gas laser device according to this embodiment is the same as the seventh embodiment shown in FIG. 12. The explanation is curtailed by appending the same references to elements which are identical with the seventh embodiment.

Figure 15:
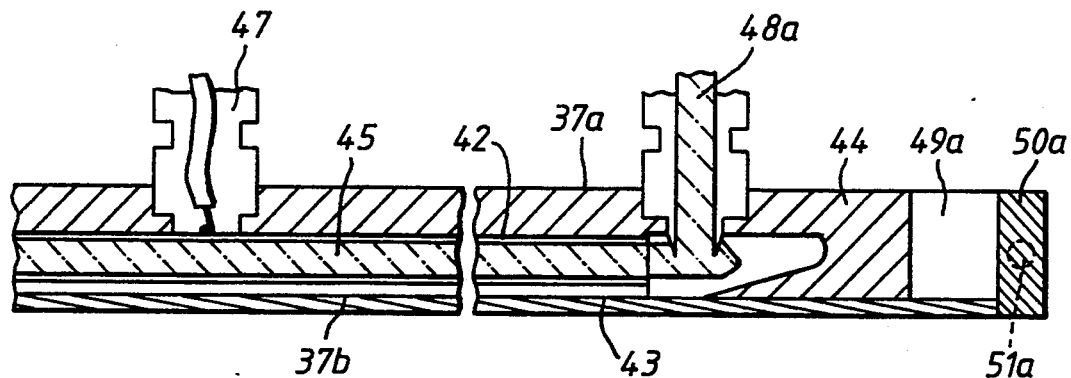
FIG. 15 is a longitudinally sectioned side view of the central part of one of the electrodes of a ninth embodiment of the invention.
Figure 18:
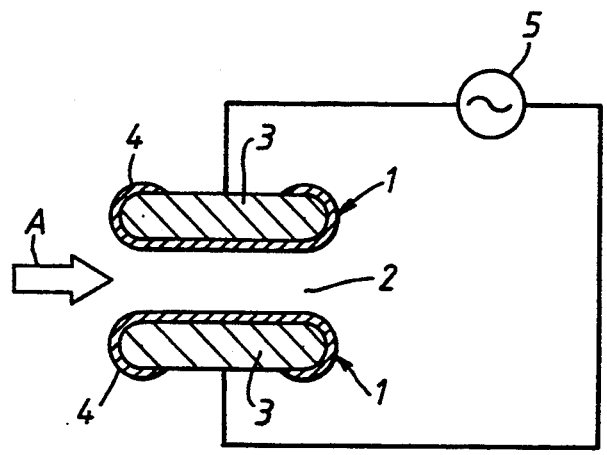
FIG. 18 is a cross sectioned side view of a pair of electrodes of a conventional cross-flow gas laser device.

FIG. 15 is a longitudinally sectional side view of the central part of FIG. 14 and shows a detailed longitudinal cross section of the first dielectric electrode 37 of the gas laser device shown in FIG. 12.

The first dielectric electrode 37 is provided with a lead wire part 47 at approximately a central position in the longitudinal direction thereof, a water inflow port 48a for supplying water 45 as a cooling medium to the metal electrode 42 and longitudinal capacity coupling control means 49a. The lead wire part 47 is provided for applying a high frequency voltage from the high frequency power source 46 to the metal electrode 42 covered with insulating rubber 44. The dielectric constant of longitudinal capacity coupling control means 49a is lower than that of the shell 37b. A lid 50a is fixed at the terminal position of the shell 37b in the longitudinal direction to make the pressure within capacity coupling control means 37e and 37f constant. Inside of the lid 50a, a gas feeding hole 51a is provided to supply gas from outside. Though not depicted in FIG. 15, the left side portion from the lead wire part 47 of the first dielectric electrode 37 is constructed in the same manner as the right side portion thereof. A water outflow port 48b, longitudinal capacity coupling control means 49b, a lid 50b, and a gas feeding hole 51b are provided in the left side portion of the first dielectric electrode 37a. The operation and advantages of the left side portion of the electrode 37a are the same as those of the right side portion thereof, so that only the latter portion will be described below.

In this embodiment, at the right side of the insulating rubber 44, longitudinal capacity coupling control means 49a is provided which is filled with the laser gas. As the dielectric constant of the laser gas is 1, the discharge is controlled from being dispersed in the longitudinal direction in the same manner as in the lateral direction in the seventh embodiment. Also, the capacitance between the terminal portion of the metal electrode 42 in the longitudinal direction and the laser chamber can be reduced. This means that the floating capacitance is reduced and high frequency output power can be supplied to the discharge means. Insulation distance at the high frequency region can be reduced. Namely, the insulation distance at the high frequency region is $\Sigma d_i/\epsilon_i$, where $d_i$ is an actual length of material i, and $\epsilon_i$ is a dielectric constant of the material i.

For simplicity, if there are three materials between the metal electrode 42 (with the voltage V) and the laser chamber (with voltage zero), which are the insulating rubber 44, longitudinal capacity coupling control means 49a, and the laser gas, the voltage VO at the edge of the first dielectric electrode 37 is as follows:

$$VO = \frac{d3/\epsilon 3}{d1/\epsilon 1 + d2/\epsilon 2 + d3/\epsilon 3} \times V$$

where d1, d2, d3 and $\epsilon 1$, $\epsilon 2$, $\epsilon 3$ are the distances and the dielectric constants of the insulating rubber 44, the longitudinal capacity coupling control means 49a and the laser gas, respectively. As the distances d1 and d2 and the dielectric constants $\epsilon 1$ and $\epsilon 3$ are definite values, respectively, the distance d3 can be set to be a smaller value when a dielectric constant $\epsilon 2$ of lower value is selected, because the voltage VO should be lower than the breakdown voltage $V_{break}$.

So, the insulation distance between the edge of the first dielectric electrode 37 and the laser chamber at the high frequency region can be reduced when a material with a lower dielectric constant in the longitudinal capacity coupling control means 49a is used. In this embodiment, the area of the insulating rubber 44 with a dielectric constant of 3.5 is reduced and the area of the laser gas with a dielectric constant of 1 is increased. Here, these dielectric constants are smaller than 10, which is the dielectric constant of the shell 37b.

In this embodiment, the laser gas fills the longitudinal capacity coupling control means 49a. But insulation gas can fill this means instead, as with the capacity coupling control means 37e in the seventh embodiment.

Next, a tenth embodiment of this invention is described with reference to FIGS. 16 and 17. A cross sectional configuration of a cross-flow gas laser device according to this embodiment is the same as the seventh embodiment shown in FIG. 12 except for the configuration of the electrodes. The explanation is curtailed by appending the same references to elements which are identical with the seventh embodiment.

Figure 16:
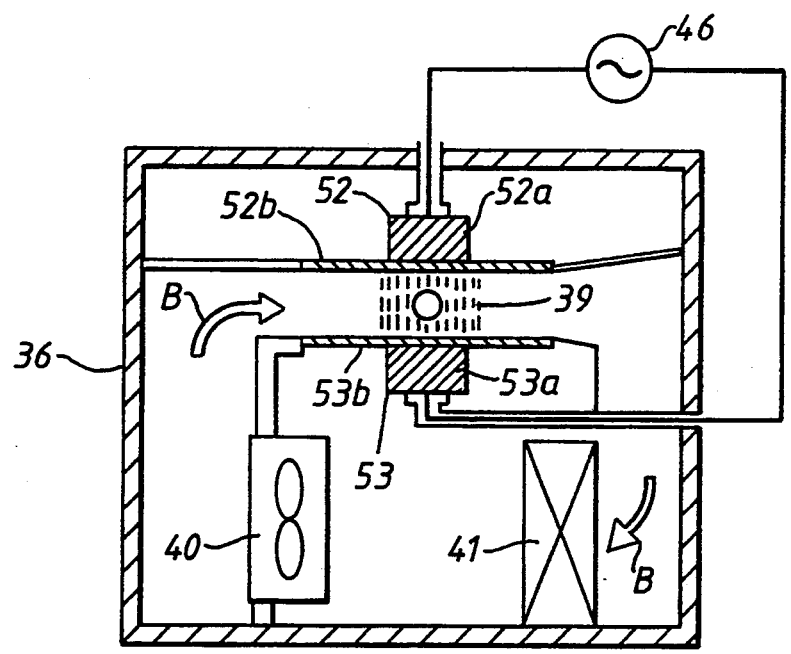
FIG. 16 is a view showing a cross sectional structure of a cross-flow gas laser device according to a tenth embodiment of this invention.

FIG. 16 shows the cross sectional configuration of a cross-flow gas laser device according to this embodiment in which the gas flow is orthogonal to the output optical axis. In FIG. 16, a first dielectric electrode 52 is placed inside of the chamber 36 in the middle of the top of the chamber 36. A second dielectric electrode 53 forming a pair with the first dielectric electrode 52 is placed within chamber 36. The two dielectric electrodes 52 and 53 are arranged to sandwich the discharge gap 39. In this case, a top surface of the second dielectric electrode 53 is formed to be parallel with a bottom surface of the first dielectric electrode 52. The blower 40 for circulating the laser gas and the heat exchanger 41 for cooling the laser gas are placed at the bottom within the chamber 36.

The first and second dielectric electrodes 52 and 53 are made up of electrode MEANs 52a and 53a and shells 52b and 53b, respectively. Because they have the same configuration, only the first dielectric electrode 52 is described below.

Figure 17:
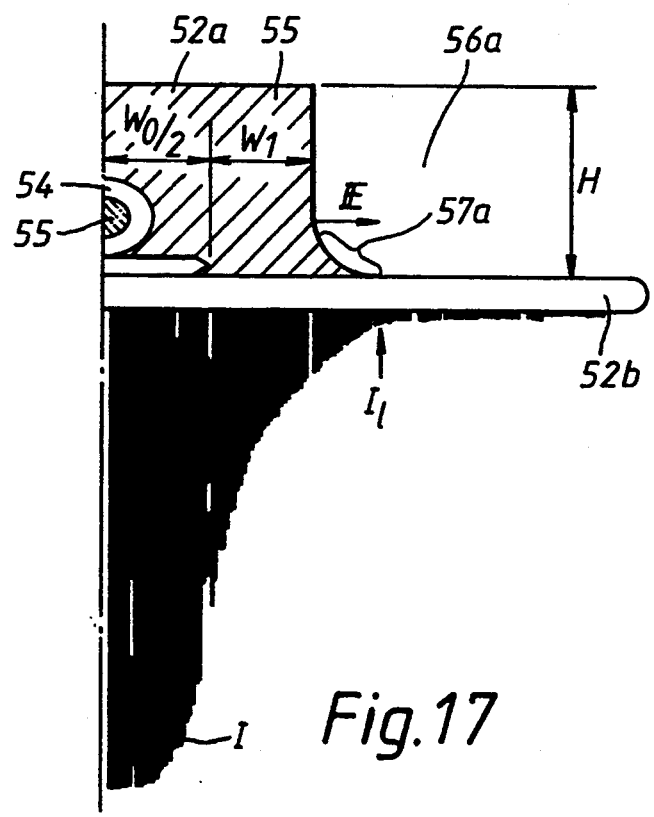
FIG. 17 is a view showing a lateral cross section of one of the electrodes (only right half portion thereof is shown) and the distribution of the discharge current during discharge operation obtained by the calculation in the embodiment of FIG. 16.

FIG. 17 shows a cross section of the first dielectric electrode 52 (only a right half portion thereof is shown) and the distribution of the discharge current during discharge operation obtained by calculation.

The first dielectric electrode 52 is made up of electrode means 52a and shell 52b formed of glass, ceramics, etc. Electrode means 52a is made up of a metal electrode 54, an insulator 25 made of, for example, insulating rubber covering the metal electrode 54, and capacity coupling control means 56a not covered with a dielectric. The metal electrode is arranged such that water 55 flows in the metal electrode 54 as a cooling medium.

The first dielectric electrode 52 has a symmetrical configuration, so that capacity coupling control means 56b (not depicted) is provided at a left side of insulator 55. Hereinafter, only a right portion of the first dielectric electrode 52 will be described. As the insulator 55 is exposed to the atmosphere of the laser gas, it is designed that the space electric field E shown in FIG. 17 is lower than the discharge electric field so as to avoid the breakdown at capacity coupling control means 56a. For this purpose, the insulator 55 is provided with an electric field relaxation area to relax the space electric field. In this case, it is necessary that a curved surface is to be provided with a curvature larger than that of a radius of 5 mm.

According to this embodiment, the distribution of the discharge current I is shown in FIG. 17. The distribution is shown in the same manner as in FIG. 3. It is supposed that the width WO of the metal electrode 24 is 20 mm, the depth W1 of the insulator 55 is 10 mm, the height of the insulator 55 is 20 mm, the dielectric constant of the insulator 55 is 3.5, and the radius of curvature of the electric field relaxation area is 7 mm. In this case, the leak discharge current I1 at a location 17 mm apart from the right edge of the metal electrode 54 is about 3% of the maximum current value. The space electric field E is lower than the breakdown electric field in this case, so that the breakdown does not occur at capacity coupling control means 56a.

Taking the laser takeout efficiency into consideration, it is necessary that an extent of the discharge at the position where the laser light is taken out is determined such that the leak current I1 at this position is lower than 10%. In the above-described case, the leak current I1 is about 10% when the width W1 is 10 mm. In order to take out the laser light with high efficiency, it is necessary that the upstream edge where the laser light is taken out is positioned at least on the downstream edge of the metal electrode 54. In the case that a laser beam with a beam radius of 20 mm is taken out, this condition requires that the center of the laser beam be set 20 mm downstream from the center of the discharge and that the width W1 of the insulator 55 be 20 mm. In this case, $CO_2$ molecules excited in the area upstream from the laser beam are carried to the laser beam area by the laser gas flow, thereby preventing significant loss.

Accordingly, it is determined that the width W1 of the insulator 55 is not more than 20 mm, and that the width $WO+2\times W1$ is not more than 60 mm.

In this embodiment, capacity coupling control means 56a is provided in the direction of the laser gas flow, capacity coupling control means with the same configuration of this embodiment can be also provided in the longitudinal direction of the metal electrode 54. In this case, the expansion in the longitudinal direction of the discharge can be controlled and the width of the metal electrode 54 in the longitudinal direction and a capacity between the laser container can be reduced. Also, the insulation distance at the high frequency region can also be reduced.

As is clear from the above explanation, the present invention is able to provide a gas laser in which at least one pair of dielectric electrodes, where a dielectric shell has been provided around the electrode means to which a high frequency voltage is applied, is placed sandwiching a discharge gap, whereby the discharge is prevented from dispersing to either side of the electrode means even when a high frequency voltage is applied to the electrode parts, by adopting a configuration in which capacity coupling control means having a lower dielectric constant than the shell is provided on either side of the electrode means in the dielectric electrode. Therefore the laser oscillation efficiency can be improved even though a dielectric electrode is used.

Obviously, numerous modifications and variations of the present invention are possible in light of the above teachings. It is therefore to be understood that within the scope of the appended claims, the invention may be practiced otherwise than as specifically described herein.

What is claimed is:

1. A gas laser device comprising:
   a high frequency power source for generating a high frequency output voltage; and
   a first electrode and a second electrode, said first electrode and said second electrode being positioned parallel to one another and spaced apart so as to form a discharge gap therebetween, wherein each of said first electrode and said second electrode comprises electrode means, capacity coupling control means provided on either side of said electrode means, and a dielectric shell enclosing portions of said electrode means and said capacity coupling control means which face said discharge gap, wherein a dielectric constant of said capacity coupling control means is lower than a dielectric constant of said dielectric shell, and wherein each of said first electrode and said second electrode is connected to said high frequency power source such that said high frequency output voltage is applied across said first electrode and said second electrode and laser light is generated within said discharge gap when laser gas circulates therethrough.

2. A gas laser device according to claim 1, wherein said dielectric shell has a rectangular cross-sectional shape and comprises partition means for dividing an area within said rectangular cross-sectional shape into a first space and a second space, and wherein said electrode means is provided within said first space and said capacity coupling control means is provided within said second space.

3. A gas laser device according to claim 2, wherein said electrode means comprises a metal electrode and cooling means for circulating a cooling medium within said first space to cool said metal electrode.

4. A gas laser device according to claim 3, wherein said dielectric shell further comprises an air chamber coupled to said first space via a sealing member, wherein an end of said metal electrode extends through said sealing member into said air chamber and is connected to a lead wire which is connected to said high frequency power source.

5. A gas laser device according to claim 1, wherein:
   said dielectric shell has a rectangular cross-sectional shape;
   said electrode means comprises a metal electrode having a circular cross-sectional shape and is disposed within said dielectric shell;
   said capacity coupling control means comprises a space formed adjacent to said electrode means within said dielectric shell; and
   cooling means circulates within said dielectric shell to cool said metal electrode.

6. A gas laser device according to claim 1, wherein an outer surface of said dielectric shell has a planar shape so as to define a discharge gap through which laser gas circulates.

7. A gas laser device according to claim 1, wherein a configuration of each of said first electrode and said second electrode satisfies the following relationship:

$$d1 - 11 \leq -(25 - 2 \times d2)/W$$

where W is a width dimension of said capacity coupling control means measured in a longitudinal direction of said first electrode and said second electrode, d1 is a distance between said capacity coupling control means and a surface of said dielectric shell which is directly adjacent to said discharge gap, and d2 is a distance between said capacity coupling control means and a surface of said dielectric shell which is not directly adjacent to said discharge gap.

8. A gas laser device according to claim 1, wherein said capacity coupling control means comprises a pair of spaces formed within said dielectric shell such that said electrode means is positioned between said pair of spaces.

9. A gas laser device according to claim 8, wherein said electrode means comprises a metal electrode and cooling means for circulating a cooling medium within said dielectric shell to cool said metal electrode.

10. A gas laser device according to claim 8, wherein an insulating gas circulates within said pair of spaces which form said capacity coupling control means.

11. A gas laser device according to claim 10, wherein a pressure of said insulating gas is not lower than a pressure of said laser gas.

12. A gas laser device according to claim 8, wherein an area within said pair of spaces which form said capacity coupling control means is exposed to a laser gas atmosphere.

13. A gas laser device according to claim 1, wherein said capacity coupling control means is provided adjacent to said electrode means both along a longitudinal and a lateral direction thereof.

14. A gas laser device according to claim 1, wherein:
   each of said first electrode and said second electrode comprises a metal electrode surrounded by an insulator; and
   said capacity coupling control means comprises a pair of spaces formed within said dielectric shell such that said electrode means is positioned between said pair of spaces.

* * * * *